(12) United States Patent
Potisek et al.

(10) Patent No.: US 9,045,585 B2
(45) Date of Patent: Jun. 2, 2015

(54) TOUGHENED EPOXY RESIN FORMULATIONS

(75) Inventors: Stephanie L. Potisek, Pearland, TX (US); Mark B. Wilson, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 202 days.

(21) Appl. No.: 13/499,310

(22) PCT Filed: Nov. 22, 2010

(86) PCT No.: PCT/US2010/057606
§ 371 (c)(1),
(2), (4) Date: Mar. 30, 2012

(87) PCT Pub. No.: WO2011/063327
PCT Pub. Date: May 26, 2011

(65) Prior Publication Data
US 2012/0259042 A1  Oct. 11, 2012

Related U.S. Application Data

(60) Provisional application No. 61/263,460, filed on Nov. 23, 2009.

(51) Int. Cl.
| | | |
|---|---|---|
| *C08G 59/24* | (2006.01) |
| *C08L 63/00* | (2006.01) |
| *C09D 163/00* | (2006.01) |
| *C09J 163/00* | (2006.01) |
| *C08G 59/22* | (2006.01) |
| *C08L 33/18* | (2006.01) |
| *C09J 131/04* | (2006.01) |
| *C09J 133/02* | (2006.01) |
| *C09J 133/06* | (2006.01) |

(52) U.S. Cl.
CPC .................. *C08G 59/22* (2013.01); *C08L 33/18* (2013.01); *C08L 63/00* (2013.01); *C09J 131/04* (2013.01); *C09J 133/02* (2013.01); *C09J 133/06* (2013.01)

(58) Field of Classification Search
USPC .......... 523/400, 427; 525/523, 524, 528, 529, 525/530, 531, 532, 533
See application file for complete search history.

(56) References Cited

U.S. PATENT DOCUMENTS

| | | | |
|---|---|---|---|
| 2,924,580 A | 2/1960 | Phillips et al. | |
| 7,279,223 B2 | 10/2007 | Rubinsztajn et al. | |
| 7,351,784 B2 | 4/2008 | Lehman, Jr. | |
| 7,842,201 B2 | 11/2010 | Tsai et al. | |
| 2007/0004871 A1* | 1/2007 | Lu et al. | 525/396 |
| 2008/0227902 A1* | 9/2008 | Papathomas | 524/443 |

FOREIGN PATENT DOCUMENTS

| | | |
|---|---|---|
| WO | WO2010/077483 | 7/2010 |
| WO | WO2011/063327 | 5/2011 |

* cited by examiner

*Primary Examiner* — Michael J Feely
(74) *Attorney, Agent, or Firm* — Joe R. Prieto

(57) ABSTRACT

A low viscosity toughened epoxy resin formulation including a divinylbenzene dioxide as a component in the formulation; wherein the formulation is useful for the manufacture of thermoset polymers.

21 Claims, 1 Drawing Sheet

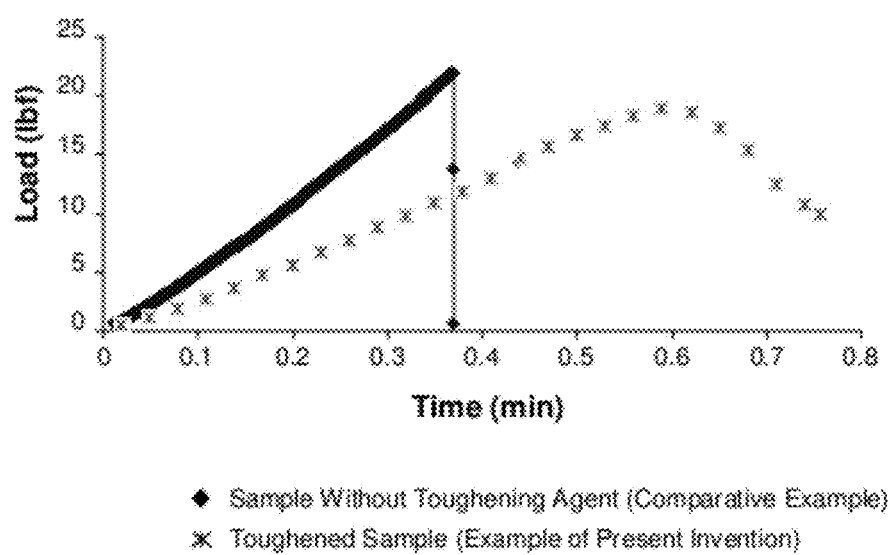

US 9,045,585 B2

TOUGHENED EPOXY RESIN FORMULATIONS

CROSS REFERENCE TO RELATED APPLICATIONS

This is a §371 application of PCT International Patent Application Number PCT/US2010/057606 filed Nov. 22, 2010, and claims priority from provisional application Ser. No. 61/263,460, filed Nov. 23, 2009, which is incorporated herein by reference in its entirety.

BACKGROUND OF THE INVENTION

1. Field of the Invention

The present invention relates to toughened epoxy resin formulations useful for the manufacture of thermoset polymers for use in electronic packaging materials, other electronic applications, composites, or industrial applications.

2. Description of Background and Related Art

Epoxy resins are used to manufacture thermoset polymers which in turn can be use in various applications including composites, coatings, adhesives and electronic materials. For example, epoxy resins are commonly used in the electronics industry for making semiconductor packaging materials. Current epoxy resin formulations used in semiconductor packaging materials, include for example, high purity diglycidyl ether of bisphenol F or diglycidyl ether of bisphenol A along with high performance or multifunctional resins such as the diglycidyl ether of naphthalene diol or the triepoxide of para-aminophenol. The known epoxy resins suffer from balancing key attributes required for acceptable processability and downstream reliability. These attributes include viscosity, total and extractable chloride content, filler loading (for coefficient of thermal expansion (CTE) and modulus modification), adhesion, flux compatibility, toughness, dispenseability, flow, and package level reliability performance including preconditioning, temperature cycle or shock, highly accelerated stress testing (HAST).

Conventional formulation approaches incorporate high purity bisphenol F or bisphenol A epoxy resins along with high performance or multifunctional epoxy resins. The inclusion of the high performance resins tend to increase the viscosity of the resultant blend negatively impacting the processability of the formulation, limiting both the amount and size of the particulate filler that can be incorporated into the formulation. Trends in electronic packaging designs toward smaller, stacked and high pitch configurations increase the demands on electronic packaging materials requiring better thermomechanical and processing performance. For example, underfill materials for electronic packaging need to have an even lower coefficient of thermal expansion (CTE) for resistance to thermal fatigue, while thermal interface materials (TIMs) need to be more thermally-conductive for cooling a heat-generating source while maintaining low viscosity with increased filler loadings.

Many electronic packaging materials are highly filled materials. The properties of the filled materials largely depend on the type of filler used and the level of filler loading. In general, increasing the filler loading level usually decreases the CTE while the modulus and thermal conductivity increase. Unfortunately, the viscosity of the highly filled material also tends to increase with an increase in filler loading.

During the application of these filled materials for electronic packaging, underfill encapsulants are required to have a low viscosity (e.g. less than 0.7 Pa·s at the dispense temperature) for adequate processing and complete, void-free, underfilling of the die. Therefore, it would be highly desirable to identify base formulation ingredients that enable low viscosity and acceptable thermomechanical properties (CTE, Tg, modulus, and in some cases, thermal conductivity). Ultimately, what is needed in the electronics industry is to develop formulated materials with low CTE (e.g. less than 30 ppm/° C.), high thermal conductivity (e.g. greater than 0.7 W/mK), moderate modulus (e.g. between 3 and 9 GPa) and proper flow in the case of underfill encapsulants (15-100 sec. across 15 mm in a 20 µm gap), the ability to tune the Tg after cure (e.g. 25-300° C.) for a specific application, all while maintaining acceptable rheology performance (application dependent).

Typical capillary underfill formulations incorporate the digycidyl ethers of bisphenol A or bisphenol F along with modifiers to improve the thermomechanical properties, such as glass transition temperature ($T_g$), of the cured system. For example, U.S. Pat. No. 7,842,201 teaches the use of Epon® 862 and Epon® 828 (Hexion Specialty Chemicals), along with Araldite® MY-0510 (Huntsman Advanced Materials) for nano-filled underfill encapsulants. The Epon® 862 is a bisphenol F based epoxy resin. The Epon® 828 is a bisphenol A based epoxy resin, and the Araldite® MY-0510 is 4-(oxiran-2-ylmethoxy)-N,N-bis(oxiran-2-ylmethyl)aniline. U.S. Pat. No. 7,279,223 discloses a number of aliphatic, cycloaliphatic, and aromatic epoxy resins. U.S. Pat. No. 7,351,784 teaches the use of cycloaliphatic amines and carbenes for capillary and no flow underfill formulations. Specific aliphatic amine structures cited are 4-(2-aminopropan-2-yl)-1-methylcyclohexanamine and 4,4'-methylenebis(2-methylcyclohexanamine).

The before mentioned epoxy resins are manufactured utilizing epichlorohydrin which is reacted with the phenolic hydroxyl group, or in the case of an aromatic amine, with the amino group resulting in the epoxy resin. During the coupling process, incomplete ring closure can occur resulting in bound or hydrolyzable chloride.

The hydrolyzable chloride content of the resin can have negative impact on the performance of the device or component during reliability testing, especially high humidity and high temperature testing such as pressure cooker exposure (PCT) 121° C./15 psi steam. During exposure to high humidity testing, the hydrolyzable chloride can be extracted from the cured polymer and form highly acidic species causing corrosion within the device. Therefore, it would be highly desirable to develop base resins that do not use epichlorohydrin or other halogenated reactants to manufacture the epoxy resin.

It is desired to provide an electronic packaging material that is a highly filled material with low viscosity and improved thermomechanical properties coupled with improved process ability and downstream package reliability and total chloride less than about 200 ppm, more preferably less than about 100 ppm, and most preferably less than about 5 ppm.

SUMMARY OF THE INVENTION

The present invention relates to the utilization of a diepoxide derivative of divinylbenzene for manufacturing thermoset polymers useful in various applications including composites, coatings, adhesives and electronic material. In one embodiment, the present invention is directed to the use of the diepoxide derivative of divinylbenzene for use in semiconductor packaging materials. The use of this resin enables high filler loading, high Tg values, and very low to no extractable ionic contamination imparted by the resin. In addition, this resin enables a number of different hardeners to be used, unlike conventional low viscosity cycloaliphatic epoxy resins. This resin is particularly suitable for use in semiconductor packaging applications including, underfill encapsulants, thermal interface adhesives, redistribution layer coatings, optical encapsulants, and die attach adhesive formulations. The comparatively low ionic contamination results from the synthetic route to manufacture the molecule which does not utilize halogenated intermediates, e.g. epichlorohydrin. The use of conventional cycloaliphatic resins with low to no chloride content is limited by suitable curing chemistries which are primarily anhydride or Lewis acid hardeners. It would therefore be desired to develop and incorporate epoxy resins with low viscosity, very low to no chloride content which can be cured with a wide range of epoxy curing agents.

For example, the formulation of the present invention includes additional reactive chemistries including cyanate esters, bismaleimides, triazine, or other reactive chemistries to achieve final properties.

One embodiment of the present invention is directed to a low viscosity, low (<5 ppm) total chloride containing epoxy resin formulation for the manufacture of electronic packaging materials such as semiconductor packaging materials, more specifically, capillary underfill encapsulants, comprising a divinylarene dioxide, such as 1,4-di(oxiran-2-yl)benzene and 1,3-di(oxiran-2-yl)benzene (collectively divinylbenzene dioxide, DVBDO), as one component in the formulation. In addition, the enabling attributes of the base resin, DVBDO, make it well suited for other applications including thermal interface adhesives, die attach adhesives, optical encapsulants, redistribution layer coatings, glob top encapsulants, dam and fill encapsulants, epoxy mold compounds, and other semiconductor packaging or electronic assembly applications. The utilization of DVBDO enables a unique combination of material properties for both improved process ability and downstream reliability performance which are unable to be achieved with current state of the technology monomers and epoxy formulation strategies.

Another embodiment of the present invention is directed to a process for preparing the above epoxy resin formulation.

BRIEF DESCRIPTION OF THE DRAWINGS

The following drawing illustrates a non-limiting embodiment of the present invention wherein: FIG. 1 shows a graphical illustration of stress vs strain curves obtained from compact tension testing of a DVBDO-based specimen with a toughening agent (Example of the Present Invention) and without a toughening agent (Comparative Example). The sample without a toughening agent exhibits brittle failure. The average $K_{1c}$ value=2.15 MPa·m$^{1/2}$. The sample with a DVBDO-CTBN-adduct toughening agent exhibits ductile failure with an increased average $K_{1c}$ value=2.44 MPa·m$^{1/2}$.

DETAILED DESCRIPTION OF THE INVENTION

In its broadest scope, the present invention includes a curable epoxy resin composition or formulation comprising (a) a divinylarene dioxide; (b) a hardener; and (c) optionally, a catalyst. The epoxide compositions or formulations of the present invention include as embodiments (1) polymerizable, curable compositions comprising divinylarene dioxide; (2) partially cured compositions comprising divinylarene dioxide; and (3) cured compositions comprising divinylarene dioxide resulting from (1) and (2) above. The present invention also relates to the production of polymers of divinylarene dioxide. In addition, some level (less than 50%) of impurities in the divinylarene dioxide are expected and can be present with little impact on final performance.

The polymerizable compositions or formulations of the present invention are advantageously low-viscosity, homogeneous liquids or thixotropic pastes at room temperature, such as for example, less than 1.0 Pa·s at 25° C. In one embodiment, the viscosity of a toughened epoxy resin formulation is less than about 100.0 Pa·s at 25° C. and less than about 10.0 Pa·s at 110° C. Solid, particulate materials, such as fillers, can be incorporated for providing various modifications to the physical properties of the uncured or cured polymer. With or without such added solid materials, the compositions have been validated to fill small gaps (ex. <20 μm) without the necessity of applying high pressures, vacuum assist, or heating to high temperatures, although such measures can be employed, if desired. In one embodiment, the polymerizable compositions can be utilized in the potting and encapsulating of fragile electronic components such as for use in underfill encapsulants or other semiconductor packaging applications. In addition, the compositions can be used to bond fragile electronic components such as for use in die attach or thermal interface adhesives, all exhibiting low total and hydrolyzable chloride content (ex. <5 ppm). In one embodiment, the chloride concentration of an epoxy resin formulation is less than about 500 ppm.

The divinylarene dioxide, component (a), useful in the present invention may comprise, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

The divinylarene dioxide (DVBDO) used for preparing the composition of the present invention may be illustrated generally by general chemical Structures I-IV as follows:

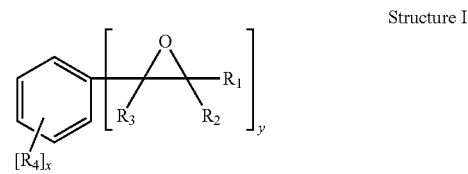

Structure I

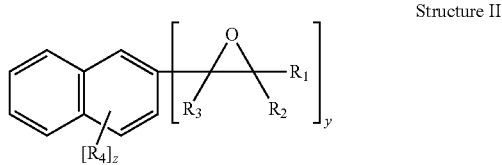

Structure II

-continued

Structure III

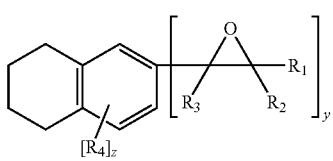

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an interger of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide used in the present invention may be produced, for example, by the process described in U.S. Patent Provisional Application Ser. No. 61/141,457, filed Dec. 30, 2008, by Marks et al., incorporated herein by reference. The divinylarene dioxide compositions that are useful in the present invention are also disclosed in, for example, U.S. Pat. No. 2,924,580, incorporated herein by reference.

In another embodiment, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In a preferred embodiment of the present invention, the divinylarene dioxide used in the epoxy resin formulation may be for example divinylbenzene dioxide (DVBDO). Most preferably, the divinylarene dioxide component that is useful in the present invention includes, for example, a divinylbenzene dioxide as illustrated by the following chemical formula of Structure V:

Structure V

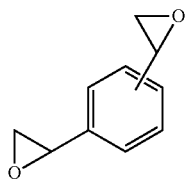

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example divinylbenzene dioxide (DVBDO), are class of diepoxides which have a relatively low liquid viscosity but a higher rigidity and crosslink density than conventional epoxy resins.

Structure VI below illustrates an embodiment of a preferred chemical structure of the DVBDO useful in the present invention:

Structure VI

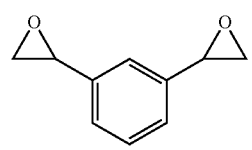

Structure VII below illustrates another embodiment of a preferred chemical structure of the DVBDO useful in the present invention:

Structure VII

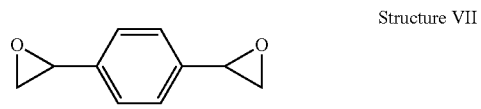 [SMILES: c1cc(C2CO2)ccc1C1CO1]

When DVBDO is prepared by the processes known in the art, it is possible to obtain one of three possible isomers: ortho, meta, and para. Accordingly, the present invention includes a DVBDO illustrated by any one of the above Structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from about 9:1 to about 1:9 ratio of meta (Structure VI) to para (Structure VII) isomers. The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In yet another embodiment of the present invention, the divinylarene dioxide may contain quantities (such as for example less than about 20 wt %) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of the pure compound but can be utilized at levels of 0 to 99% of the epoxy resin portion.

In one embodiment, the divinylarene dioxide useful in the present invention comprises, for example, divinylbenzene dioxide (DVBDO), a low viscosity liquid epoxy resin. The viscosity of the divinylarene dioxide used in the process of the present invention ranges generally from about 0.001 Pa·s to about 0.1 Pa·s, preferably from about 0.01 Pa·s to about 0.05 Pa·s, and more preferably from about 0.01 Pa·s to about 0.025 Pa·s, at 25° C.

The concentration of the divinylarene oxide used in the present invention as the epoxy resin portion of the formulation may range generally from about 0.5 weight percent (wt %) to about 100 wt %, preferably, from about 1 wt % to about 99 wt %, more preferably from about 2 wt % to about 98 wt %, and even more preferably from about 5 wt % to about 95 wt % depending on the fractions of the other formulation ingredients.

One advantageous property of the divinylarene dioxide useful in the present invention is its rigidity. The rigidity property of the divinylarene dioxide is measured by a calculated number of rotational degrees of freedom of the dioxide excluding side chains using the method of Bicerano described in *Prediction of Polymer Properties*, Dekker, New York, 1993. The rigidity of the divinylarene dioxide used in the present invention may range generally from about 6 to about 10, preferably from about 6 to about 9, and more preferably from about 6 to about 8 rotational degrees of freedom.

The concentration of the divinylbenzene dioxide in the formulation will depend on the formulation ingredients, however in general, the concentration of the DVBDO is between about 1 wt to about 99 wt %, preferably between about 5 wt % to about 90 wt %, and most preferably between about 7 wt % to about 60 wt % based on the weight of the total composition.

In one embodiment of the system of the present invention, divinylbenzene dioxide is the epoxy resin component, used in a concentration of about 20 wt % to 80 wt % based on the weight of the total composition.

In the broadest terms of the present invention, a hardener (curing agent or cross-linker) or curing agent blend is used in the present invention. Generally, any hardener known in the art which is appropriate for curing epoxy resins may be used. The hardener of choice may depend on the application requirements. The hardener useful in the present invention may include, for example, but are not limited to, dicyandiamide, substituted guanidines, phenolic, amino, benzoxazine, anhydrides, amido amines, polyamides, polyamines, aromatic amines, polyesters, polyisocyanates, polymercaptans, urea formaldehyde and melamine formaldehyde resins, and mixtures thereof.

The concentration of the hardener but will depend on stoichiometric considerations (molar ratio). A typical molar ratio of epoxy to hardener is about 0.25 to 4, more preferably, about 0.5 to 2, and most preferably about 0.9 to 1.1.

In the broadest terms of the present invention, a catalyst may be used in the present invention. Generally, any homogeneous or heterogeneous catalyst known in the art which is appropriate for facilitating the reaction between an epoxy resin and a hardener may be used. The catalyst may include for example, but are not limited to, imidazoles, tertiary amines, phosphonium complexes, Lewis acids, or Lewis bases, transition metal catalysts, and mixtures thereof.

The catalyst useful in the present invention may include for example a Lewis acid such as boron triflouride complexes, Lewis bases such as tertiary amines like diazabicycloundecene and 2-phenylimidazole, quaternary salts such as tetrabutyphosphonium bromide and tetraethylammonium bromide, and organoantimony halides such as triphenylantimony tetraiodide and triphenylantimony dibromide; and mixtures thereof.

The concentration of the catalyst is generally between about 0.05 wt % to about 10 wt %, preferably between about 0.1 wt % to about 5 wt %, and most preferably between about 0.15 wt % to about 1 wt % based on the weight of the resin composition. The catalyst level can be adjusted to allow adequate processing in the final application.

One of the primary means to improve the thermomechanical performance of filled composites is to incorporate particulate filler. As aforementioned, the present invention employs a divinylarene dioxide, particularly one derived from divinylbenzene such as for example divinylbenzene dioxide (DVBDO), which has a low liquid viscosity (0.012 Pa·s), and thus the amount of filler used with this epoxy resin can be increased and the resulting formulation can have improved thermomechanical properties compared to conventional epoxy resins.

In an embodiment of the present invention wherein the formulation is useful for electronic packaging materials, the formulations preferably have a highly filled material to improve thermomechanical properties of the cured system imparting better component reliability performance. For example, the formulation may include one or more optional functional or non-functional fillers such as for example, fused silica, natural silica, synthetic silica, aluminum trihydroxide, aluminum hydroxide oxide, boron nitride, silicon carbide, mica, aluminum powder, zinc oxide, silver, graphite, aluminum nitride, aluminum oxide, mullite, gold, carbon, carbon nanotubes, graphene, glass fibers/sheets, carbon fibers, or other organic or inorganic particulate filler, either added into the formulation in their end state or formed in-situ. The surface of the fillers can be treated to improve filler and polymer interaction.

The acceptable particle size of the filler material generally may range from nano to conventional micro size. For example, the particle size of the filler may be in the range of from about 0.0005 microns ($\mu m$) to about 500 $\mu m$, preferably from about 0.100 $\mu m$ to about 100 $\mu m$, and more preferably from about 0.1 $\mu m$ to about 30 $\mu m$.

The acceptable filler morphologies of the filler material useful in the present invention include platelet, fibrous, spherical, needles, amorphous or any combination thereof. These fillers with different size and different shape may be combined to have a synergistic effect on coefficient of thermal expansion (CTE), modulus, electrical and/or heat conductivity.

The fillers utilized in the present invention can be surface treated either before incorporation or in-situ during the compounding of the formulation. Examples of surface treatments include fatty acids, silane coupling agents or silazane compounds.

Filler loadings useful in the present invention may vary. The concentration of the filler is generally from 0 wt % to about 99 wt %, preferably from about 0.1 wt % to about 95 wt %, more preferably from about 10 wt % to about 90 wt %, and most preferably from about 50 wt % to about 80 wt % based on the weight of the solids in the composition. Volumetric loadings can range from 0 to 90%, more preferably, 10 to 70% and most preferably from about 20 to 60% depending on the desired properties. In one embodiment, the filler loading of the formulation comprises about 1 percent to about 90 percent by volume.

The composition of the present invention advantageously may use a wide array of hardeners and the composition allows more choices of advanced fillers, such as nano fillers, thus the formulation options of the present composition is broadened. The system of the present invention also has low (e.g. less than 25 ppm) to no extractable halides. In addition, because the system also allows high filler loading, the system can achieve lower CTE (e.g. less than about 30 ppm/° C.) or better thermal conductivity (e.g. greater than about 1.0 W/mK) at the same flow rate during application or better flow rate at same CTE or heat conductivity. In the case of electrically conductive formulations, the conducting filler loading can be increased (e.g. greater than 40% by volume) to improve the electrical conductivity of the cured formulation (e.g. <0.1 ohm cm).

The formulation of the present invention, for example, may exhibit a coefficient of thermal expansion of from about 2 ppm/° C. to about 55 ppm/° C. below the Tg. The formulation of the present invention, for example, may also exhibit a flow rate of from about 5 seconds to about 300 seconds in a 50 $\mu m$ gap across an 18 millimeter by 18 millimeter glass die on a glass substrate at a temperature of less than about 85° C.

The fracture toughness (as measured by the method described in ASTM D 5045) of the final materials may be enhanced by adding a toughening agent to the formulation. A blend of DVBDO and amine hardener(s), a single hardener or combination of hardeners, can be toughened with various categories of toughening agents. The toughening agents includes, but are not limited to, elastomers (CTBN and CTBN adducts), particulates (core shell particles), hyperbranched polymers, block copolymers (Fortegra), polyurethanes, polyetherimides, nanofiller particulates, thermoplastics, carbon nanotubes or mixtures thereof. The elastomers used as toughening agents comprise pre-dispersed rubber particles, liquid rubbers or mixtures thereof. The thermoplastics used as toughening agents comprise polyetherimines polyurethanes or mixtures thereof. The toughening agent was shown to increase the fracture toughness up to levels of 10 wt %. At higher concentrations, the fracture toughness was shown to plateau or decrease (FIG. 1).

In general, the concentration of the toughening agent is from about 0.01 weight percent to about 90 weight percent.

While the addition of silica filler to DVBDO blends (in the case of model encapsulants) increased the fracture toughness of the material, toughening agents can be used to increase the toughness values further, as illustrated by the data shown in FIG. 1. Without toughening agent, brittle fracture occurs (Comparative Example shown in FIG. 1). A more ductile material is obtained upon the addition of toughening agent (Example of the Present Invention shown in FIG. 1) improving the fatigue resistance of the cured (>40% conversion) polymer.

In one embodiment, the toughening agent added to the formulation comprises a reaction product of two or more ingredients in the formulation. In another embodiment, the toughening agent comprises a polymer-divinylbenzene (DVBDO) adduct, a copolymer-DVBDO adduct, or mixtures thereof. For example, the polymer-DVBDO adduct toughening agent comprises a carboxy terminated butadiene acrylonitrile-DVBDO adduct and/or an amine terminated butadiene acrylonitrile-DVBDO adduct.

Other optional components that may be useful in the present invention are components normally used in resin formulations known to those skilled in the art. For example, the optional components may comprise compounds that can be added to the composition to enhance application properties (e.g. surface tension modifiers or flow aids), reliability properties (e.g. adhesion promoters) the reaction rate, the selectivity of the reaction, and/or the catalyst lifetime.

An assortment of additives may be added to the compositions of the present invention including for example, other resins such as epoxy resins that are different from the divinylarene dioxide, component (a), diluents, stabilizers, fillers, plasticizers, catalyst de-activators, and the like; and mixtures thereof.

Other additives useful in the formulation of the present invention include for example, a halogen containing or halogen free flame retardant; a synergist to improve the performance of the flame extinguishing ability such magnesium hydroxide, zinc borate, or metalocenes; a solvent for processability including for example acetone, methyl ethyl ketone, an Dowanol PMA; adhesion promoters such as modified organosilanes (epoxidized, methacryl, amino), acytlacetonates, or sulfur containing molecules; wetting and dispersing aids such as modified organosilanes, Byk 900 series and Byk W-9010, modified fluorocarbons; air release additives such as Byk-A 530, Byk-A 525, Byk-A 555, Byk-A 560; surface modifiers such as slip and gloss additives (a number of which are available from Byk-Chemie); a reactive or non-reactive thermoplastic resin such as polyphenylsulfones, polysulfones, polyethersolufones, polyvinylidene fluoride, polyetherimide, polypthalimide, polybenzimidiazole, acyrlics, phenoxy, urethane; a mold release agent such as waxes; other functional additives or prereacted products to improve polymer properties such as isocyanates, isocyanurates, cyanate esters, allyl containing molecules or other ethylenically unsaturated compounds, and acrylates; and mixtures thereof. In one embodiment, the formulation of the present invention includes at least one wetting agent, at least one dispersing agent, pigments, at least one flow additive: or a mixture thereof.

The concentration of the additives used in the present invention may range generally from 0 wt % to about 99 wt %, preferably from about 0.001 wt % to about 95 wt %, more preferably from about 0.01 wt % to about 10 wt %, and most preferably from about 0.05 wt % to about 5 wt %.

For example, when the additive is a solvent, the solvent content comprises less than about 50 weight percent.

As a general illustration of a toughened epoxy resin formulation in accordance with the present invention, the formulation may contain the following ingredients in their respective amounts:

| | |
|---|---|
| DVBDO (The Dow Chemical Company) | 20-30 wt % |
| Kyahard AA pt (Nippon Kayaku) | 10-20 wt % |
| Denka FB-1SDX Silica (Denka Corporation) | 45-75 wt % |
| Byk W-9010 (Byk Chemie) | 0.5 wt % |
| Silwet 7608 (GE Silicones) | 0.5 wt % |
| Byk A-530 (Byk-Chemie) | 0.5 wt % |
| Silane Z-6040 (Dow Corning) | 0.7 wt % |
| Toughening Agent | 0.5-15 wt % |

The process for preparing a toughened, low viscosity (e.g. less than about 3.0 Pa·s at 25° C., low total chloride containing (e.g. less than about 15 ppm) epoxy resin formulation of the present invention includes blending (a) a divinylbenzene dioxide; (b) a hardener; (c) a toughening agent; (d) optionally, a catalyst; and (e) optionally, other ingredients as needed. For example, the preparation of the curable epoxy resin formulation of the present invention is achieved by blending with or without vacuum in a Ross PD Mixer (Charles Ross), the divinylbenzene dioxide, a toughening agent, a curing agent, a catalyst, and optionally any other desirable additives. Any of the above-mentioned optional assorted formulation additives, for example fillers, may also be added to the composition during the mixing or prior to the mixing to form the composition.

All the components of the epoxy resin formulation are typically mixed and dispersed at a temperature enabling the preparation of an effective epoxy resin composition having a tougheness for the desired application. The temperature during the mixing of all components may be generally from about 20° C. to about 80° C. and preferably from about 25° C. to about 35° C. Lower mixing temperatures help to minimize reaction of the resin and hardener components to maximize the pot life of the formulation.

The blended compound is typically stored at sub-ambient temperatures to maximize shelf life. Acceptable temperature ranges are for example from about −100° C. to about 25° C., more preferably, from about −70° C. to about 10° C., and even more preferably at from about −50° C. to about 0° C. As an illustration of one embodiment, the temperature may be about −40° C.

The blended formulation can then be applied via a number of methods depending on the end application. Typical application methods include syringe or cartridge dispensing (in the case of underfills, die attach adhesives, and thermal interface adhesives). Suitable dispensing machines are manufactured by Asymtek, A Nordson Company, or Speedline Technologies. The dispense valve design can include positive displacement, time-pressure, jet dispense, or alternate valve design with precise volume control. Another acceptable deposition method is via printing, either screen or stencil in the case of wafer applied applications or board level applications.

The curing of the thermosettable composition may be carried out at a predetermined temperature and for a predetermined period of time sufficient to cure the composition and the curing may be dependent on the hardeners used in the formulation. For example, the temperature of curing the formulation may be generally from about 10° C. to about 200° C.; preferably from about 25° C. to about 100° C.; and more preferably from about 30° C. to about 90° C.; and the curing time may be chosen between about 1 minute to about 4 hours, preferably between about 5 minutes to about 2 hours, and more preferably between about 10 minutes to about 1 hour. Below a period of time of about 1 minute, the time may be too short to ensure sufficient reaction under conventional processing conditions; and above about 4 hours, the time may be too long to be practical or economical.

In one embodiment, the formulation of the present invention exhibits a weight loss during cure of less than about 60 percent via thermogravimetric analysis according to ASTM E 1131.

The divinylbenzene dioxide (DVBDO), the epoxy resin of the present invention, may be used as the sole resin to form the epoxy matrix in the final formulation; or the divinylbenzene dioxide resin may be used as one of the components in the final formulation. For example the epoxy resin may be used as an additive diluent. The use of divinylbenzene dioxide imparts improved properties, in particular increased fracture toughness measured by ASTM D 5045 (at room temperature, 25° C.), to the curable composition and the final cured product over conventional glycidyl ether, glycidyl ester or glycidyl amine epoxy resins. The DVBDO's unique combination of low viscosity in the uncured state, and high Tg after cure due to the rigid DVBDO molecular structure and increase in crosslinking density, enables a formulator to apply new formulation strategies. In addition, the ability to cure the epoxy resin with an expanded hardener range, offers the formulator significantly improved formulation latitude over other types of epoxy resins such as epoxy resins of the cycloaliphatic type resins (e.g., ERL-4221, formerly from The Dow Chemical Company).

In addition, the use of divinylbenzene dioxide provides a desirable low to no extractable halogen content to maintain the reliability of a package device's performance in high humidity testing and field use over the lifetime of the package device. The halogen content, such as chlorine content, is generally less than about 500 ppm; preferably less than 100 ppm, and more preferably less than 15 ppm.

The thermoset product (i.e. the cross-linked product made from the thermosettable composition) of the present invention shows several improved properties over conventional epoxy cured resins. For example, the cured product resulting from the formulation of the present invention may have a glass transition temperature (Tg) of from about −55° C. to about 200° C. Generally, the Tg of the resin is higher than about −60° C., preferably higher than about 0° C., more preferably higher than about 10° C., more preferably higher than about 25° C., and most preferably higher than about 50° C. In one embodiment, the Tg of the cured product resulting from the formulation of the present invention from about 25° C. to about 300° C. Below about −55° C., the technology described in this application does not provide any further significant advantage versus the conventional technology described in the prior art; and above about 300° C., the technology described in the present application generally would lead to a very brittle network without the inclusion of toughening technologies which is not suitable for the applications within the scope of the present application.

Due to the elimination of epichlorohydrin during the epoxidation of the vinyl groups, there is little to no hydrolyzable or total chlorides present in the resin. Therefore, the thermoset product of the present invention exhibits a hydrolyzable chloride content via ion chromatography after Parr bomb extraction of ~60 mesh particles at 120° C. for 24 hours temperature of between 0.00001 and 5000 ppm, preferably between about 0.00001 and 100 ppm and most preferably between about 0.00001 and 5 ppm.

The thermoset product of the present invention exhibits a glass transition temperature of between 25° C. and 300° C., preferably between about 90° C. and 250° C. and most preferably between about 100° C. and 225° C. via ASTM D 3418.

The thermoset product of the present invention exhibits a fracture toughness value, as measured by ASTM D 5045 (at room temperature), of higher than about 0.5 MPa·m$^{1/2}$, preferably greater than about 0.7 MPa·m$^{1/2}$, more preferably greater than about 1.0 MPa·m$^{1/2}$, even more preferably higher than about 1.7 MPa·m$^{1/2}$, and most preferably higher than about 2.0 MPa·m$^{1/2}$. In one embodiment the upper fracture toughness of the thermoset product may be about 3.5 MPa·m$^{1/2}$.

The thermoset product of the present invention exhibits a flexural modulus below the Tg of higher than about 1 GPa, preferably higher than about 2 GPa and more preferably between about 3.5 MPa and 15 GPa via ASTM D 790. In one embodiment the flexural modulus of the cured product may be from about 0.05 GPa to about 20 GPa.

The thermoset product of the present invention exhibits a coefficient of thermal expansion (CTE) below the Tg of about 65 ppm/° C., and preferably lower than about 50 ppm/° C. via ASTM D 5335.

The toughened epoxy resin formulation of the present invention may be used in thermoset systems where conventional epoxy resins are used. Some non-limiting examples of applications wherein the toughened epoxy resin formulation of present invention may be used include, for example, as a polymer to manufacture a redistribution layer on a semiconductor device; as a polymer to manufacture an underfill encapsulant; as a polymer to manufacture an optical encapsulant; as a polymer to manufacture an epoxy mold compound; as a polymer to manufacture a printed circuit board; as a polymer to manufacture a coating; as a polymer to manufacture a composite; as a polymer to manufacture a potting or encapsulating compound; or as a polymer to manufacture an adhesive. Other examples of applications for the toughened epoxy resin formulation of the present invention can be envisioned by those skilled in the art.

In one embodiment, the toughened epoxy resin formulations of the present invention, utilizing the diepoxide derivative of divinylarene, may be used as semiconductor packaging materials. The use of the epoxy resin formulation enables high filler loading (e.g., >30% by volume), high Tg values after cure (e.g., >90° C.), and very low to no extractable ionic contamination (e.g., <15 ppm) imparted by the resin. In addition, this resin enables a number of different hardeners to be used, unlike conventional low viscosity cycloaliphatic epoxy resins. The epoxy resin is particularly suitable for use in semiconductor packaging applications including, underfill encapsulants, thermal interface adhesives, redistribution layer coatings, optical encapsulants, and die attach adhesive formulations. The comparatively low ionic contamination results from the synthetic route to manufacture the molecule which does not utilize halogenated intermediates, e.g. epichlorohydrin. The use of conventional cycloaliphatic resins with low to no chloride content is limited by suitable curing chemistries which are primarily anhydride or Lewis acid hardeners. An object of the present invention is to develop and incorporate epoxy resins with low viscosity, very low to no chloride content which can be cured with a wide range of epoxy curing agents and the incorporation thereof into high performance thermoset systems.

EXAMPLES

The following examples and comparative examples further illustrate the present invention in detail but are not to be construed to limit the scope thereof.

Comparative Examples A and B and Examples 1 through 11 were carried out using the procedures as described below; and included the following raw materials: CTBN-Hypro 1300×31, a toughening agent; and Fortegra, a toughening agent commercially available from The Dow Chemical Company.

A master batch of CTBN-DVBDO adduct was prepared by reacting DVBDO (25.08 g, 6.587 mmol, 1 equiv), $PPh_3$ (0.1 g, 0.381 mmol, 0.06 equiv) and CTBN (25.03 g, 154.633 mmol, 24 equiv) at 80° C. for 7 hr. The reaction was monitored by the disappearance of acid via titration with perchloric acid and tetraethylammonium bromide. The viscous orange liquid was used without further purification. The EEW of the adduct was determined to be 189. The resulting product was 50 wt % CTBN.

$K_{1c}$ values were obtained via compact tension testing. $K_{1c}$ values reported are an average of several specimens.

Examples 1-3

DVBDO (1.05 equiv), and PACM (1 equiv) were added to a glass vial. Fortegra toughening agent was added at the desired loading (5 wt %, 10 wt %, or 15 wt % of the total mass of the blend). The vial was shaken for 30 minutes and then degassed for 15 minutes at 25° C. The blend was poured into a mold and cured at 85° C. for 1 hour and then at 175° C. for 1 hour. Compact tension specimens were cut from the resulting plaque and $K_{1c}$ values were obtained. Exact masses for each example are reported in Table I. Resulting $K_{1c}$ values are also reported in Table I.

Comparative Example A

0% Toughening Agent

DVBDO (1.05 equiv), and PACM (1 equiv) were added to a glass vial and shaken for 30 minutes. The blend was degassed for 15 minutes at 25° C. The blend was poured into a mold and cured at 85° C. for 1 hour and then at 175° C. for 1 hour. Compact tension specimens were cut from the resulting plaque and $K_{1c}$ values were obtained. The exact mass for this comparative example is reported in Table I. The resulting $K_{1c}$ value is also reported in Table I.

TABLE I

|  | Example 1 5% Fortegra (grams) | Example 2 10% Fortegra (grams) | Example 3 15% Fortegra (grams) | Comparative Example A 0% Fortegra (grams) |
|---|---|---|---|---|
| DVBDO | 23.50 | 22.26 | 21.02 | 24.73 |

TABLE I-continued

|  | Example 1 5% Fortegra (grams) | Example 2 10% Fortegra (grams) | Example 3 15% Fortegra (grams) | Comparative Example A 0% Fortegra (grams) |
|---|---|---|---|---|
| PACM | 14.50 | 13.74 | 12.98 | 15.24 |
| Fortegra | 2.00 | 4.00 | 6.00 | 0.00 |
| $K_{1c}$ Value ($MPa \cdot m^{1/2}$) | 0.99 | 1.01 | 0.87 | 0.58 |

Examples 4-6

DVBDO, and Jeffamine D230 were added to a glass vial. DVBDO-CTBN adduct was added at the desired loading (5 wt %, 10 wt %, or 15 wt % CTBN of the total mass of the blend). The epoxy/Jeffamine D230 ratio=1.05, where the epoxy equivalents includes the DVBDO and that from the DVBDO-CTBN adduct. The vial was shaken for 30 minutes and then degassed for 15 minutes at 25° C. The blend was poured into a mold and cured at 85° C. for 1 hour and then at 175° C. for 1 hour. Compact tension specimens were cut from the resulting plaque and $K_{1c}$ values were obtained. Exact masses for each example are reported in Table II. The resulting $K_{1c}$ values are also reported in Table II.

Comparative Example B

0% Toughening Agent

DVBDO (1.05 equiv), and Jeffamine D230 (1 equiv) were added to a glass vial and shaken for 30 minutes. The blend was degassed for 15 minutes at 25° C. The blend was poured into a mold and cured at 85° C. for 1 hour and then at 175° C. for 1 hour. Compact tension specimens were cut from the resulting plaque and $K_{1c}$ values were obtained. The exact mass for this example is reported in Table II. The $K_{1c}$ value is reported in Table II.

TABLE II

|  | Example 4 5% CTBN (grams) | Example 5 10% CTBN (grams) | Example 6 15% CTBN (grams) | Comparative Example B 0% CTBN (grams) |
|---|---|---|---|---|
| DVBDO | 20.39 | 17.35 | 14.30 | 22.43 |
| Jeffamine D230 | 15.64 | 14.75 | 13.65 | 16.57 |
| DVBDO-CTBN adduct | 4.05 | 7.99 | 12.00 | 0.00 |
| $K_{1c}$ Value ($MPa \cdot m^{1/2}$) | 1.46 | 1.90 | 1.90 | 1.22 |

Examples 7-9

DVBDO and PACM were added to a glass vial. DVBDO-CTBN adduct was added at the desired loading. CTBN was added at 5 wt %, 10 wt %, or 15 wt % of the total mass of the blend. The epoxy/PACM ratio=1.05, where the epoxy equivalents includes the DVBDO and that from the DVBDO-CTBN adduct. The vial was shaken for 30 minutes and then degassed for 15 minutes at 25° C. The blend was poured into a mold and cured at 85° C. for 1 hour and then at 175° C. for 1 hour. Compact tension specimens were cut from the resulting plaque and $K_{1c}$ values were obtained. Exact masses for each example are reported in Table III. $K_{1c}$ values are also reported in Table III.

TABLE III

|  | Example 7 5% CTBN (grams) | Example 8 10% CTBN (grams) | Example 9 15% CTBN (grams) | Comparative Example A 0% CTBN (grams) |
|---|---|---|---|---|
| DVBDO | 21.63 | 18.53 | 16.55 | 24.73 |
| PACM | 16.14 | 13.52 | 12.58 | 15.24 |
| DVBDO-CTBN adduct | 4.04 | 8.07 | 12.00 | 0.00 |
| $K_{1c}$ Value (MPa · m$^{1/2}$) | 1.06 | 1.03 | 0.79 | 0.58 |

Example 10

DVBDO (17.88 g, 0.221 mol), DVBDO-CTBN adduct (8.05 g, 0.043 mol), Jeffamine D230 (7.53 g, 0.125 mol), and PACM (6.58 g, 0.125 mol) were added to a glass vial and shaken for 30 minutes. Epoxy/amine ratio=1.05. The blend was then degassed for 15 minutes at 25° C. $K_{1c}$ values were obtained by preparing plaques with the above blend and testing via compact tension testing The blend was poured into a mold and cured at 85° C. for 1 hour and then at 175° C. for 1 hour. Compact tension specimens were cut from the plaque and $K_{1c}$ values were obtained. $K_{1c}$=1.06. $T_g$=140° C.

Example 11

The formulation in this Example 11 was blended utilizing a SpeedMixer® DAC150 (commercially available from FlackTek) according to the following procedure:

DVBDO (14.03 g), DVBDO-CTBN adduct (6.27 g, 10 wt % in resin and hardener), and MP15EF (48.00 g, 60 wt % overall) were added to a 100 mL polypropylene container and mixed at 3500 rpm for 55 seconds. Hexamethyl disilazane Z-7069 (0.64 g, 1.3% relative to silica) was added and mixed at 3500 rpm for 55 seconds. Hardeners PACM (5.16 g) and Jeffamine® D230 (5.90 g) were then added (0.95:1, hardener: resin) and mixed again for 55 seconds at 3500 rpm. The blend was poured into a mold and cured at 85° C. for 1 hour and then at 175° C. for 1 hour. $K_{1c}$ values were obtained via compact tension testing. $K_{1c}$=2.42 MPa·m$^{1/2}$, viscosity=1.83 cP, $T_g$=151° C.

Example 12

The formulation in this Example 12 was blended utilizing a SpeedMixer® DAC150 (commercially available from FlackTek) according to the following procedure:

DVBDO (21.00 g), DVBDO-CTBN adduct (3.11 g, results in CTBN being incorporated at 4 wt % in resin and hardener), carbon black (0.15 g, 0.15 wt % of the total mass of the blend), and silica MP15EF (60.00 g, 60 wt % of the total mass of the blend) were added to a 100 mL polypropylene container and mixed at 3500 rpm for 55 seconds. Silane 6040 (0.66 g, 1.1% relative to silica) was added and the reagents were mixed at 3500 rpm for 55 seconds. Hardeners PACM (6.89 g) and Jeffamine® D230 (7.88 g) were then added (0.95:1, hardener: resin) and the blend was mixed again for 55 seconds at 3500 rpm. Silwet 7608 (0.30 g, 0.3% of the total mass of the formulation) was added to the mixtures and mixed using the high speed mixer for 55 seconds at 3500 rpm. The blend was poured into a mold and cured at 85° C. for 1 hr and then 175° C. for 1 hour. The resulting plaque was post-cured for an additional hour at 175° C.

The invention claimed is:

1. A toughened epoxy resin formulation comprising (a) at least one divinylarene dioxide, (b) at least one toughening agent, wherein the at least one toughening agent comprises a polymer-divinylbenzene dioxide adduct, a copolymer-divinylbenzene dioxide adduct, or mixtures thereof; and (c) at least one hardener; wherein when the epoxy resin formulation is cured, the resulting cured product has an increased fracture toughness of greater than 0.5 MPa m$^{1/2}$.

2. The formulation of claim 1, wherein the fracture toughness of the resulting cured product is greater than about 1.0 MPa m$^{1/2}$.

3. The formulation of claim 1, wherein the concentration of the at least one toughening agent is from about 0.01 weight percent to about 90 weight percent.

4. The formulation of claim 1, wherein the at least one toughening agent further comprises core shell particles, hyperbranched polymers, elastomers, block copolymers, nanofiller particulates, thermoplastics, carbon nanotubes or mixtures thereof.

5. The formulation of claim 4, wherein the elastomers comprise pre-dispersed robber particles, liquid rubbers or mixtures thereof; or wherein the thermoplastics comprise polyetherimines, polyurethanes or mixtures thereof.

6. The formulation of claim 1 further comprising a solvent; wherein the solvent content comprises less than about 50 weight percent.

7. The formulation of claim 1, wherein the polymer-divinylbenzene dioxide adduct toughening agent comprises a carboxy terminated butadiene acrylonitrile-divinylbenzene dioxide adduct and/or an amine terminated butadiene acrylonitrile-divinylbenzene dioxide adduct.

8. The formulation of claim 1, wherein the viscosity of the toughened epoxy resin formulation is less than about 100.0 Pa·s at 25° C. and less than about 10.0 Pa·s at 110° C.; and wherein the chloride concentration of the epoxy resin formulation is less than about 500 ppm.

9. The formulation of claim 1, wherein the at least one divinylarene dioxide comprises divinylbenzene dioxide.

10. The formulation in claim 1, wherein the at least one divinylarene dioxide may include an impurity level of less than 50 percent.

11. The formulation of claim 1, wherein the modulus of the resulting cured product comprises from about 0.05 GPa to about 20 GPa.

12. The formulation of claim 1, wherein the glass transition temperature of the resulting cured product comprises from about 25° C. to about 300° C.

13. The formulation of claim 1 further comprising at least one particulate filler.

14. The formulation of claim 13, wherein the filler loading of the formulation comprises from about 1 percent to about 90 percent by volume.

15. The formulation of claim 1, wherein the at least one divinylarene dioxide is present in the formulation at a concentration of from about 0.05 weight percent to about 95 weight percent.

16. The formulation of claim 1 further comprising at least one wetting agent; at least one dispersing agent; pigments; at least one flow additive; or a mixture thereof.

17. The formulation of claim 1 further comprising at least one epoxy resin different from the at least one divinylarene dioxide component; at least one reactive resin different from the at least one divinylarene dioxide component; at least one hardener package; at least one thermoplastic additive; or mixtures thereof.

18. The formulation in claim 1 further comprising additional reactive chemistries including cyanate esters, bismaleimides, triazine, or other reactive chemistries to achieve final properties.

19. The formulation of claim 1, wherein the formulation exhibits a weight loss during cure of less than about 60 percent via thermogravimetric analysis according to ASTM E 1131.

20. An article made from the formulation of claim 1.

21. The article of claim 20 comprising an electronic packaging material, a semiconductor device, an underfill, an optical encapsulant; an epoxy mold compound; a printed circuit board; a coating; a composite; a potting compound, an encapsulating compound; or an adhesive.

* * * * *